(12) United States Patent
Graf

(10) Patent No.: US 8,044,321 B2
(45) Date of Patent: Oct. 25, 2011

(54) BEAM-CATCHING DEVICE FOR A PROCESSING MACHINE

(75) Inventor: Daniel Graf, Ditzingen (DE)

(73) Assignee: TRUMPF Werkzeugmaschinen GmbH +Co. KG, Ditzingen (DE)

(*) Notice: Subject to any disclaimer, the term of this patent is extended or adjusted under 35 U.S.C. 154(b) by 828 days.

(21) Appl. No.: 12/043,647

(22) Filed: Mar. 6, 2008

(65) Prior Publication Data

US 2008/0230523 A1    Sep. 25, 2008

Related U.S. Application Data

(63) Continuation-in-part of application No. PCT/EP2006/008653, filed on Sep. 6, 2006.

(30) Foreign Application Priority Data

Sep. 6, 2005   (EP) .................. PCT/EP2005/009535

(51) Int. Cl.
*B23K 26/42* (2006.01)
*B23K 26/14* (2006.01)
*B23K 7/10* (2006.01)
*B26F 3/00* (2006.01)

(52) U.S. Cl. ......... 219/121.67; 219/121.72; 219/121.84

(58) Field of Classification Search ............. 219/121.67, 219/121.7–121.72, 121.84–121.86
See application file for complete search history.

(56) References Cited

U.S. PATENT DOCUMENTS

| | | | | |
|---|---|---|---|---|
| 2,641,918 A | * | 6/1953 | Smith | 68/23.4 |
| 3,601,576 A | * | 8/1971 | Schlafli et al. | 219/121.71 |
| 3,808,619 A | * | 5/1974 | Vanderveer | 110/213 |
| 3,824,368 A | * | 7/1974 | Locke | 219/121.64 |
| 3,965,328 A | * | 6/1976 | Locke | 219/121.72 |
| 4,626,651 A | * | 12/1986 | Taniguchi et al. | 219/121.63 |
| 5,032,005 A | * | 7/1991 | Woodruff | 359/230 |
| 5,334,816 A | * | 8/1994 | Sugiyama | 219/121.83 |
| 5,424,825 A | * | 6/1995 | Delhaye et al. | 356/318 |
| 6,107,597 A | * | 8/2000 | Staschewski et al. | 219/121.63 |
| 6,692,337 B2 | * | 2/2004 | Jennings et al. | 451/36 |
| 6,891,125 B2 | * | 5/2005 | Muhlenbach | 219/121.67 |

FOREIGN PATENT DOCUMENTS

| | | | |
|---|---|---|---|
| EP | 1454700 | | 9/2004 |
| JP | 57044102 A | * | 3/1982 |
| JP | 61-020680 | | 1/1986 |
| JP | 61289991 A | * | 12/1986 |
| JP | 02142696 A | * | 5/1990 |
| JP | 04-091884 | | 3/1992 |

OTHER PUBLICATIONS

International Search Report from corresponding PCT Application No. PCT/EP2006/008653, mailed Jun. 29, 2007, 5 pages. International Preliminary Report on Patentability of the International Searching Authority from corresponding PCT Application No. PCT/EP2006/008653, mailed Apr. 8, 2008, 15 pages.

* cited by examiner

*Primary Examiner* — Samuel M Heinrich
(74) *Attorney, Agent, or Firm* — Fish & Richardson P.C.

(57) ABSTRACT

A processing machine for workpiece processing includes a cutting head that produces a cutting beam directed toward a workpiece, and a beam-catching device for receiving a discharge of the cutting beam from an underside of the workpiece during processing of the workpiece. The beam-catching device includes a housing defining an opening that opens toward the cutting beam and a beam-catching space adjacent the opening, the cutting beam discharging from the underside of the workpiece during the processing of the workpiece and entering the beam-catching space of the housing through the opening. The beam-catching device also includes at least one nozzle on at least one wall section of the housing, the nozzle feeding a fluid jet as a free jet to the beam-catching space in such a way that the at least one fluid jet crosses the cutting beam.

31 Claims, 7 Drawing Sheets

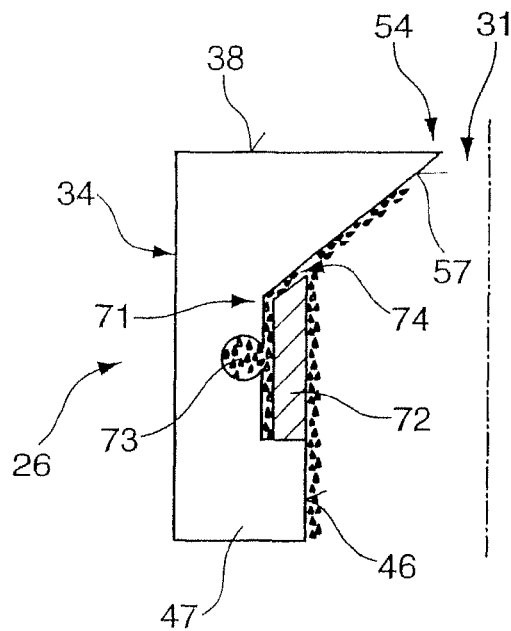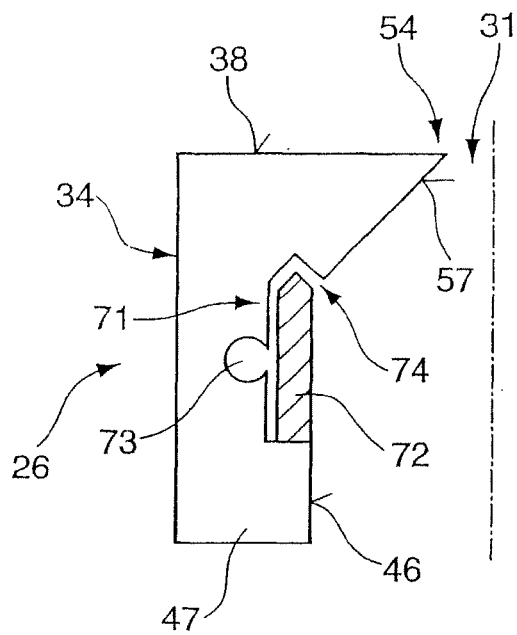
Fig. 10a   Fig. 10b
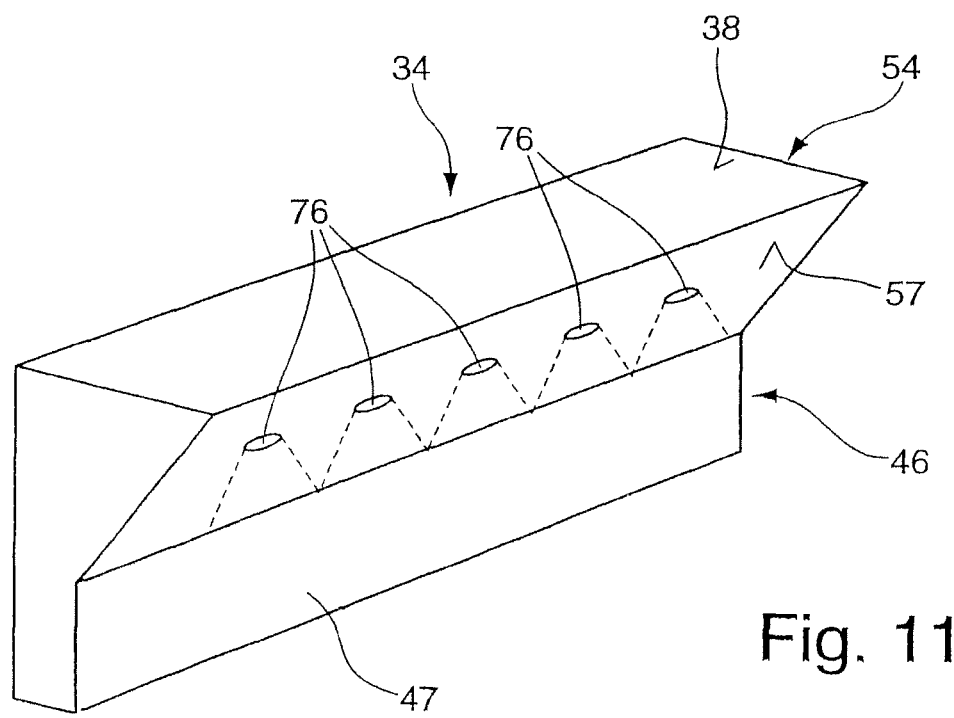
Fig. 11

BEAM-CATCHING DEVICE FOR A PROCESSING MACHINE

CROSS REFERENCE TO RELATED APPLICATIONS

This application is a continuation-in-part of, and claims priority under 35 U.S.C. §120 to PCT/EP2006/008653, filed on Sep. 6, 2006, and designating the U.S. and to PCT/EP2005/009535, filed on Sep. 6, 2005, and designating the U.S. Both of these applications are hereby incorporated by reference in their entirety.

TECHNICAL FIELD

The invention relates to a beam-catching device for a processing machine.

BACKGROUND

JP 4-91884 discloses a processing machine in which a workpiece is arranged on a workpiece support for processing. This workpiece is moved transversely using the workpiece support to a processing direction of a cutting head. To process the workpiece, a cutting beam is directed onto the workpiece, the cutting beam discharging on the underside during the processing of the workpiece. Assigned as beam-catching device to this discharge region is a housing having an opening through which the cutting beam discharging at the bottom enters the housing. The opening and the housing extend along the working region of the cutting head.

EP 1 454 700 A1 discloses a cooling and/or flushing lance of a laser processing machine. Such a lance is used during the laser cutting of tubes by such a lance being inserted into the pipe. The lance has an entry opening for the laser beam and/or for expelling the molten material into the lance interior space. A mixture consisting of a liquid and a gaseous medium, such as, for example, water and compressed air, which form a water mist, is fed through an opening close to the base of the lance. The water mist is intended to sufficiently absorb the beam power during the cutting and draw off the cutting spatter.

SUMMARY

In some aspects, a beam-catching device for a cutting-beam processing machine includes a housing and at least one nozzle. The housing defines an opening positioned to introduce a cutting beam of the processing machine, where the cutting beam is discharged from an underside of a workpiece during beam processing, into a beam-catching cavity defined within the housing. The at least one nozzle is positioned to feed a free jet of fluid into the beam-catching cavity in such a way that the fluid jet intercepts the cutting beam within the cavity.

Implementations can include one or more of the following features. For example, the housing opening can be a line-like opening having an elongated beam-catching space, and the at least one nozzle can be arranged on an end wall section and the fluid jet is oriented essentially parallel to the opening. The housing opening can be a point-like opening, the housing can have an essentially cylindrical beam-catching cavity, and the at least one nozzle can be arranged radially to the entry axis of the opening. The housing opening can be a point-like opening, the housing can have an essentially tubular beam-catching cavity, the essentially point-like opening can pass through a lateral surface of the housing, and the at least one nozzle is provided on an end face, assigned to the opening of the housing, and the fluid jet crosses an entry axis of the opening.

The beam-catching device can include a fluid film formed on a base of the housing by at least one nozzle, where the fluid film crosses the base of the housing. The housing can have a channel-shaped base that is supplied with fluid by a slotted nozzle in the shape of a segment of a circle. The base of the housing can have a surge channel below the opening, the cutting beam being caught in the surge channel. The base of the housing can have a transport band or a transport conveying worm.

A plurality of nozzles can be provided on wall sections below the opening of the housing, and the plurality of nozzles can form a fluid curtain in the beam-catching cavity of the housing, the fluid curtain intercepting the cutting beam.

The nozzles can be each independently activatable. At least the outflow direction of the nozzles or the volume of the fluid jet can be set independently.

The housing can define a fluid-carrying channel. The housing can define a slope that crosses the cutting beam. The housing can include a baffle element on a wall section opposite the nozzle feeding the fluid jet into the beam-catching space, the baffle element having a baffle surface that is inclined in such a way as to point away from the opening of the housing.

The lateral wall sections of the housing can be wetted with a fluid film. The lateral wall sections of the housing can be cooled. The lateral wall sections of the housing can be provided with fabric, such that the wall sections are wetted with fluid by the capillary action of the fabric.

At least one extraction opening can be provided in the housing, and an extraction device can be attached to the extraction opening.

The opening of the housing can be formed between entry edges that are formed by two surfaces arranged at an angle of less than 90° to one another, the entry edges being spaced apart such that the cutting beam enters the housing between the two entry edges essentially without contact. The entry edge can be sharp. The entry edge can adjoin an end face of the housing, the end face lying in a plane with the supporting plane of the workpiece to be processed. The entry edge can have a surface section that points toward the workpiece and that is recessed relative to the end face of the housing. The surface section can extend at least partly along the opening. The entry edge can be beveled. The entry edge can be removable. The entry edge can be formed from a plurality of individual segments. At least one individual segment for forming the entry edge can be movable to set a width of the opening.

The opening in the housing can be of adjustable width.

The nozzle can be defined at a wall of the housing.

In another general aspect, a processing machine for workpiece processing includes a cutting head that produces a cutting beam directed toward a workpiece, and a beam-catching device for receiving a discharge of the cutting beam from an underside of the workpiece during processing of the workpiece. The beam-catching device includes a housing defining an opening positioned to introduce the cutting beam of the processing machine that is discharged from the underside of the workpiece into a beam-catching cavity defined within the housing, and at least one nozzle positioned to feed a free jet of fluid into the beam-catching cavity in such a way that the fluid jet intercepts the cutting beam within the beam-catching cavity.

In another general aspect, a method of processing a workpiece includes producing a cutting beam and directing the cutting beam toward a workpiece, introducing the cutting beam that is discharged from an underside of the workpiece into a beam-catching cavity defined within a housing, and feeding a free jet of fluid into the beam-catching cavity in such a way that the fluid jet intercepts the cutting beam within the beam-catching cavity.

In some aspects, a beam-catching device is used in processing machines that process a workpiece with a cutting beam. The cutting beam enters the beam-catching device such that the energy of the cutting beam entering the beam-catching device is absorbed and process reliability is improved.

The configuration according to the invention of the beam-catching device enables the energy of the cutting beam entering the beam-catching device to be absorbed. The cutting beam is formed, for example, by a laser beam and a gas flow surrounding said laser beam. The at least one fluid jet formed as a free jet collides with the cutting beam. As a result, the energy of the laser beam and of its gas flow is absorbed. The kinetic energy of the gas flow is thereby reduced in particular. During the collision, the at least one free jet is dispersed and deflected downward on account of the impulse, which results when the cutting beam and the free jet meet. The dispersion of the fluid jet forms a water film that extends up to the wall sections in the beam-catching space of the housing. As a result, the wall sections are at the same time wetted with liquid and the slag is cooled, such that slag that has entered the beam-catching device does not remain adhering thereto. In addition, the introduction of the fluid jet as a free jet that crosses the cutting beam has the advantage that the cutting beam does not strike a flushing film in an unimpeded manner, where the flushing film is directed on the base of the beam-catching space. The flushing area is therefore not blown free or blown clear. Adherence of the entrained slag is therefore prevented, enabling the slag to be easily drawn off. Furthermore, the collision of the at least one free jet with the cutting beam reduces the chances of a direct impingement of the cutting beam on a flushing plane or at the base of the beam-catching device. As a result, backsplash of the medium of the free jet or of the flushing film toward the opening is prevented or reduced.

According to some implementations, provision is made, in the case of a linear opening of the housing having an elongated beam-catching space, for the at least one nozzle feeding the free jet to be arranged on an end wall section of the housing and for the fluid jet to be oriented essentially parallel to the opening. Such beam-catching devices having linear openings are also designated as line catchers. Such beam-catching devices are used, for example, in flat-bed laser cutting machines. The fluid jet oriented below the linear opening therefore enables the energy of the entering cutting beam to be absorbed as a function of the processing position of the cutting beam along the entire opening of the housing.

According another implementation, provision is made, in the case of a point-like opening of the housing having an essentially cylindrical beam-catching space, for the at least one nozzle feeding the free jet to be arranged radially to the entry axis of the opening. This again enables the entering cutting beam to be absorbed by the fluid jet, where the water film typically resulting therefrom is again formed. Such beam-catching devices having a point-like opening are also designated as point catchers. Such point catchers are used in "combination laser cutting machines", in which the cutting beam and the beam-catching device is arranged statically and the material to be processed, in particular plate-like material, is moved relative to the cutting beam.

According to another implementation, provision is made, in the case of a point-like opening of the housing having an essentially tubular beam-catching space, in which the essentially point-like opening passes through a lateral surface of the housing, for the at least one nozzle to be provided on an end face, assigned to the opening, of the housing and for the free jet fed to cross an entry axis of the opening. Such beam-catching devices are also designated as tube catchers. Such tube catchers are used inside tubular materials whose lateral surface or tube wall is processed. The use of such beam-catching devices prevents the cutting beam from damaging an inner side of the tubular material to be processed or prevents an opposite wall section from being severed.

Provision can be made for at least one nozzle to feed a fluid film onto a base of the housing of the beam-catching device. As a result, a flushing film is formed on the base and crosses the housing along the base. This has the advantage that slag that has not yet completely cooled down is prevented from adhering to the base and efficient removal of the slag is made possible. In addition, energy absorption of the cutting beam entering the housing can be effected if complete absorption has not been completely effected on account of the formation of a water film after the free jet has crossed the cutting beam. The fluid film at the base can be provided under pressure and the housing slag resting on the base is preferably drawn off under pressure in order to flush the base clear. The nozzle can be designed in the shape of a segment of a circle or is adapted to the base contour.

According to another implementation, provision is made for a plurality of nozzles that form a fluid curtain of individual fluid jets to be provided on wall sections that run below an opening of the housing and so as to be oriented relative to the entry edge of the opening. The fluid curtain crosses the incoming cutting beam, as a result of which energy absorption is achieved as an alternative to or in addition to a fluid jet. At the same time, the entering slag can be cooled and bound, such that adherence to wall sections of the housing is prevented or reduced.

The nozzles assigned to the beam-catching space can be activated individually or independently. In particular, the outflow direction of the nozzles can be set. As a result, a fluid jet and/or a partial fluid curtain that crosses the cutting beam can be oriented. Energy can therefore be saved and the circulating fluid quantity can be reduced. In addition, the volume of the discharging fluid jet at the nozzles can also be set.

According to a further alternative configuration for the additional energy absorption of the cutting beam and for the removal of the slag, provision is made for a separate fluid-carrying channel or slope that crosses the cutting beam to be provided in the beam-catching space of the housing along or below the opening. As a result, a flushing-film volumetric flow adapted to the energy absorption of the cutting beam and having an appropriate flow velocity and a volumetric flow provided for the slag removal at the base of the housing and having an appropriate flow velocity can be provided.

A baffle element can be provided on a wall section opposite the nozzle feeding the fluid jet as free jet into the beam-catching space, where the baffle element has a baffle surface that is inclined in such a way as to point away from the opening of the housing. The fluid jet is deflected in the direction of the base of the housing by such a baffle element, such that the opposite wall section is protected and spurting-out is prevented or reduced.

According to a further advantageous configuration, provision is made for the lateral wall sections of the housing to be capable of being wetted with a fluid film or for them to be capable of being cooled by integrated cooling. As a result, adherence of slag and dust and therefore clogging of the housing after a prolonged operating period are prevented or reduced. The introduction of a fluid film may alternatively be provided by means of undercuts that include a surge wall in order to form the fluid film on the wall section. Alternatively, spreading nozzles or the like can be provided. Integrated cooling can be formed by cooling passages in the wall section, which keep the latter at a low temperature.

According to a further alternative configuration, provision is made for the lateral wall sections of the housing to be provided with a fabric in order to wet the wall sections by the capillary action of the fabric. As a result, adherence of the slag can likewise be prevented or reduced.

According to a further configuration, provision is made for at least one extraction opening to be provided in the housing in order to attach an extraction device. As a result, a vacuum can be produced in the interior space of the housing, ambient air passing into the housing through the opening. As a result, the fluid and residual quantities of gas, dust particles and slag particles located in the housing can be extracted. Cooling can be achieved at the same time.

A further alternative configuration for the energy absorption of the cutting beam provides for the base below the opening of the housing to include a surge channel in which the cutting beam is caught. Fluid can subsequently be fed from below through such a surge channel.

According to another implementation, provision is made for the width of the opening of the housing to be reduced to a minimum without affecting the cutting beam when entering the housing. The entry edges of the opening of the housing extend right up to the cutting beam, such that unhindered entry of the cutting beam into the beam-catching device is only just made possible. At the same time, the configuration of the entry edges ensures that the cutting beam, for example, a gas flow in a laser cutting beam, is not affected, since the tapering surfaces that form an entry edge have a thickness of virtually zero in the entry region of the opening.

The width of the opening is reduced to a minimum by the virtually tangential or tangential arrangement of the entry edges relative to the gas flow of the cutting beam, as a result of which the risk of good parts and/or of remnants becoming caught is reduced or minimized, the good parts and/or remnants being cut out of the workpiece.

This configuration can prevent the cutting beam discharged underneath at the workpiece from being reflected onto the workpiece. Rather, the cutting beam enters the housing completely or in such a way as to be neutral in terms of flow and, due to the configuration of the opening width, can no longer discharge from below and reach the underside of the workpiece. Furthermore, damage caused by slag reflection to the good parts and to the parts of the machine adjoining the opening of the housing is avoided. The configuration and arrangement of the entry edges therefore permit complete and unaffected entry of the cutting beam into the housing, with the formation of burrs on the workpiece being minimized or reduced in size and with the risk of parts becoming caught being minimized or reduced and also while absorbing slag in an effective manner.

According to a further configuration, provision is made for the entry edge to be designed to be sharp. As a result, the effect on the entering flow is minimized or reduced. The sharp configuration of the entry edges can be achieved by two surfaces, which are arranged at an angle of less than 90° to one another and form the entry edge.

The entry edge of the opening of the housing can adjoin an end face of the housing, the end face lying in a supporting plane of the workpiece to be processed. As a result, the beam-catching device can be traversed in the X direction in an unhindered manner during the machining of the workpiece transversely to the longitudinal extent of the opening of the housing in order to cut good parts out of the workpiece. At the same time, the opening of the beam-catching device can be directed under parts already cut out of the workpiece without the parts becoming caught.

According to some configurations, the entry edge has a surface section that points toward the workpiece and that is recessed relative to the end face and runs parallel to the end face. In the event of a possible formation of burrs on the underside of the workpiece, this configuration makes it possible for there to be an inclined contact surface between the recessed surface section and the end face in order to avoid catching of parts.

The surface section, recessed relative to the end face, of the entry edge is of very narrow design and extends at least partly along the opening. This can provide for a small clearance space beneath the workpiece at the cutting gap relative to the entry edge, such that the risk of parts becoming caught is minimized or reduced. At the same time, the cutting beam discharging at the underside of the workpiece can enter the housing in an unaffected manner and therefore without the formation of burrs.

According to an alternative embodiment, the entry edge has a planar or curved bevel or an inclined contact surface that merges into the end face of the housing.

According to a preferred embodiment, the entry edge is designed as a rectilinear edge for forming the opening of the housing. As a result, a "line catcher" is formed, the line catcher having two entry edges that run parallel to one another and preferably extend over the entire length of the processing region of a cutting head of the processing machine. To minimize the risk of parts becoming caught, provision can be made for the entry edges to have geometries differing therefrom, such as, for example, a wave-like or zigzag-shaped contour or a contour having a shallow V shape or a contour oriented at an angle to the Y direction or a saw-tooth, sinusoidal or rectangular contour. In order to catch the cutting beam, the contour of the opening in the housing additionally requires the housing to be moved up in order to take into account the position of the cutting head in the X direction.

Provision is made for the width of the opening in the housing to be adjustable. One entry edge or both entry edges can be designed to be traversable or displaceable in order to permit adaptation to different cutting beam diameters.

The at least one entry edge for forming the opening of the housing can be provided on the housing in a detachable manner. As a result, the basic housing can be provided for a multiplicity of processing machines, which can be adapted to different cutting beam diameters by exchanging the entry edges.

A preferred configuration of the entry edge for forming the opening of the housing provides for a multiplicity of individual segments to be provided. As a result, simple and quick exchange is possible in the event of damage to individual segments. In addition, individual segments can be provided, for example, in an end region of the opening, which has a larger opening width than the adjacent segments, in order to enable, for example, the cutting beam to pierce a workpiece without damaging the opening of the housing.

The opening of the housing can have an entry edge formed from individual segments, which, for example, can be activated in a movable manner for setting the opening width. As a result, the opening gap can be enlarged at any desired location when the cutting beam pierces the workpiece. In addition, the opening width can be adapted to various processing parameters during processing of a workpiece. The individual segments can be activated in a motor-operated manner via actuating elements.

According to a further configuration, provision is made for the opening of the housing to be formed by a diaphragm device or a band having a passage that tracks the cutting beam and clears an entry opening. As a result, only a small entry opening, which is assigned to the cutting beam, is formed, the remaining region of the opening remaining covered. This further minimizes or reduces the risk of parts becoming caught. In addition, the workpiece lying above the opening is affected to a smaller degree by reflection. The design of the housing and its variants can constitute an especially advantageous embodiment for a housing with and without a free jet.

The invention and further advantageous embodiments and developments of the same are described and explained in more detail below with reference to the examples shown in the drawings. The features to be gathered from the description and the drawings can be used according to the invention individually on their own or in any desired combination.

DESCRIPTION OF THE DRAWINGS

FIG. 11 shows a perspective detailed view of a further embodiment of a wall section of the housing of the beam-catching device.

DETAILED DESCRIPTION

Figure 1:
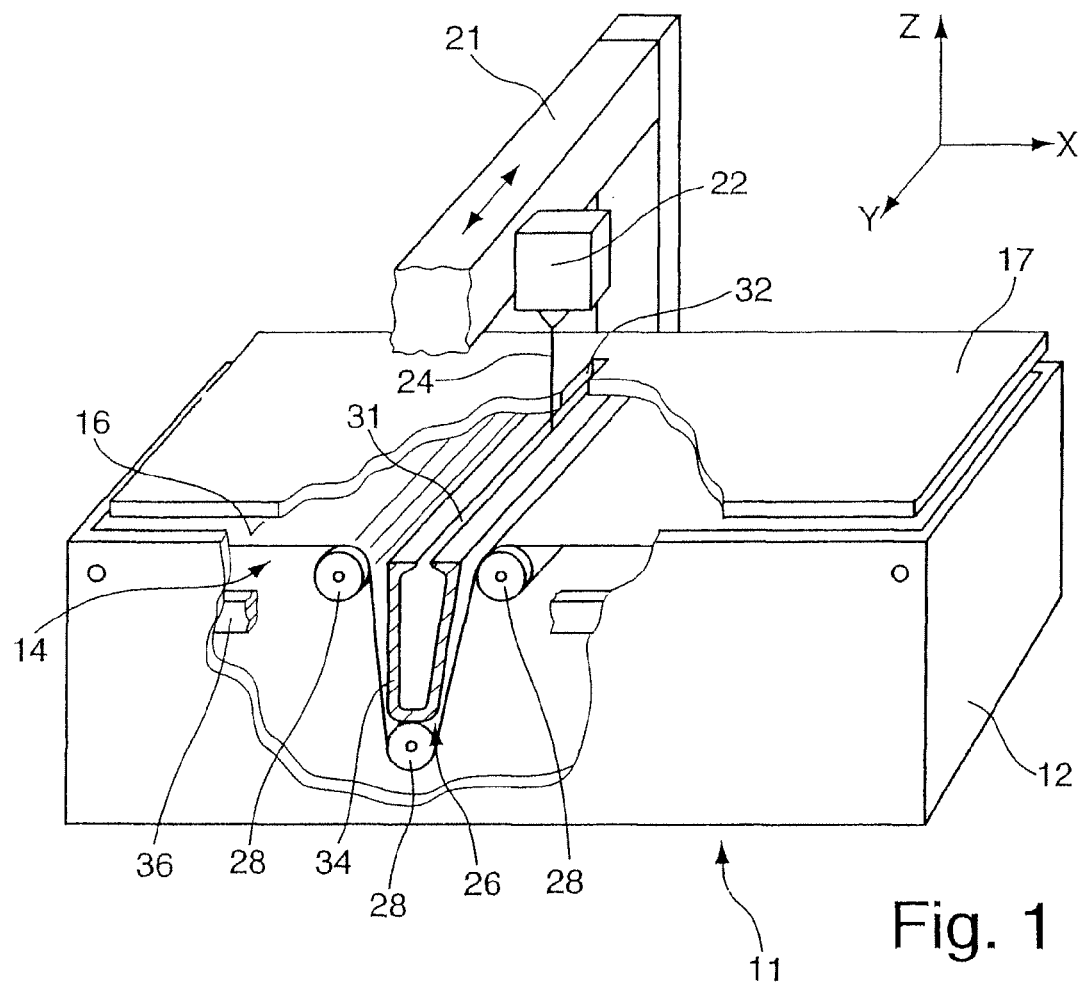
FIG. 1 shows a perspective view of a processing machine having a beam-catching device.

A processing machine 11 is shown in perspective view in FIG. 1. The processing machine 11 is preferably designed as a laser cutting machine. Alternatively, the processing machine 11 can be a plasma cutting machine or a flame cutting machine. A machine bed 12 includes a workpiece support 14, which, for example, according to FIG. 1, is formed by a supporting band 16 that is held statically in the machine bed 12. In an alternative embodiment, the supporting band can be movably driven and can additionally perform a transport function. The machine bed 12 and the workpiece support 14 support a workpiece 17. A cutting head 22 is movable in the Y direction along a linear axis 21 and forms a working region of the cutting head 22. In addition, a linear axis that is traversable in the X direction (in that it can be moved along the positive and negative X direction) can be provided. Furthermore, a vertically traversable (along the Z direction) linear axis can be provided. A cutting beam 24 is directed from the cutting head 22 onto the workpiece 17 in order to carry out processing at the workpiece 17.

At an underside of the workpiece 17, a beam-catching device 26 that is positioned between deflection rollers 28 of the supporting band 16 is provided in the processing region of the cutting head 22. The beam-catching device 26 can be traversable, for example, along a guide 36 in the X direction (along the positive and negative X direction). The beam-catching device 26 can be coupled to the movement of the cutting head 22 to move in a particular manner with the movement of the cutting head 22. The beam-catching device 26 can be controlled by a separate drive from the drive that controls the cutting head 22. Or, the beam-catching device 26 can be controlled by the same drive that controls the cutting head 22.

The beam-catching device 26 has a housing 34 that defines an opening 31 that is directed toward (that is, that opens toward) the cutting head 22; the opening 31 generally extends in the Y direction along the entire processing region of the cutting head 22. During the processing of the workpiece 17, the cutting beam 24, which discharges on the underside of the workpiece 17 after formation of a cutting gap 32, can be caught by the opening 31 of the housing 34 of the beam-catching device 26.

Figure 2:
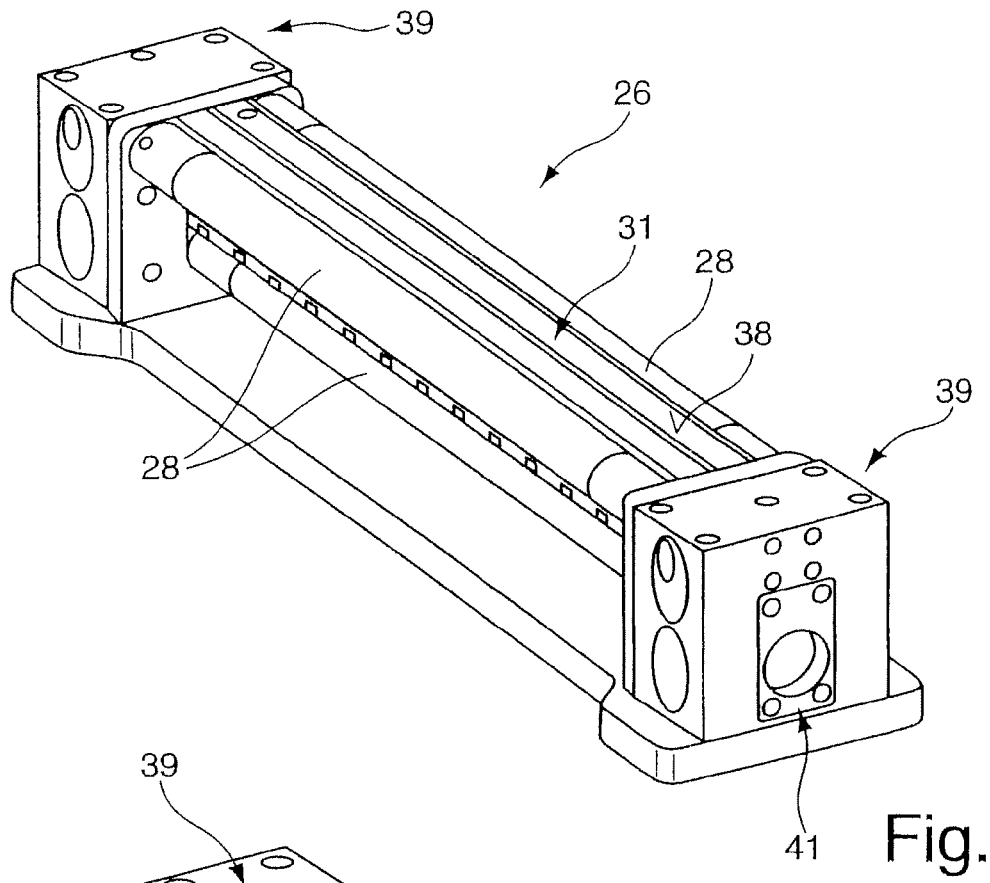
FIG. 2 shows a perspective view of the beam-catching device of FIG. 1.

A perspective view of the beam-catching device 26 according to FIG. 1 is shown in FIG. 2. The beam-catching device 26 has an essentially closed housing 34 that defines the opening 31 at an end face 38 pointing toward the workpiece 17. According to some implementations, the opening 31 of the beam-catching device 26 or of other beam-catching devices can be closed by a traversable curtain or a traversable diaphragm as a function of the position of the cutting head 22, such as to provide for a small entry opening for the cutting beam 24.

Provided at the respective end faces 56 of the housing 34 are flange units 39 that are connected to the guide 36 for accommodating in a traversable manner. In addition, the flange units 39 accommodate the deflection rollers 28 of the supporting band 16 and the housing 34. Furthermore, supply connections 41 are provided; the supply connections 41 provide a passage through which fluids and/or gaseous media can be fed into and can be drawn out of an interior space of the housing 34.

Figure 3:
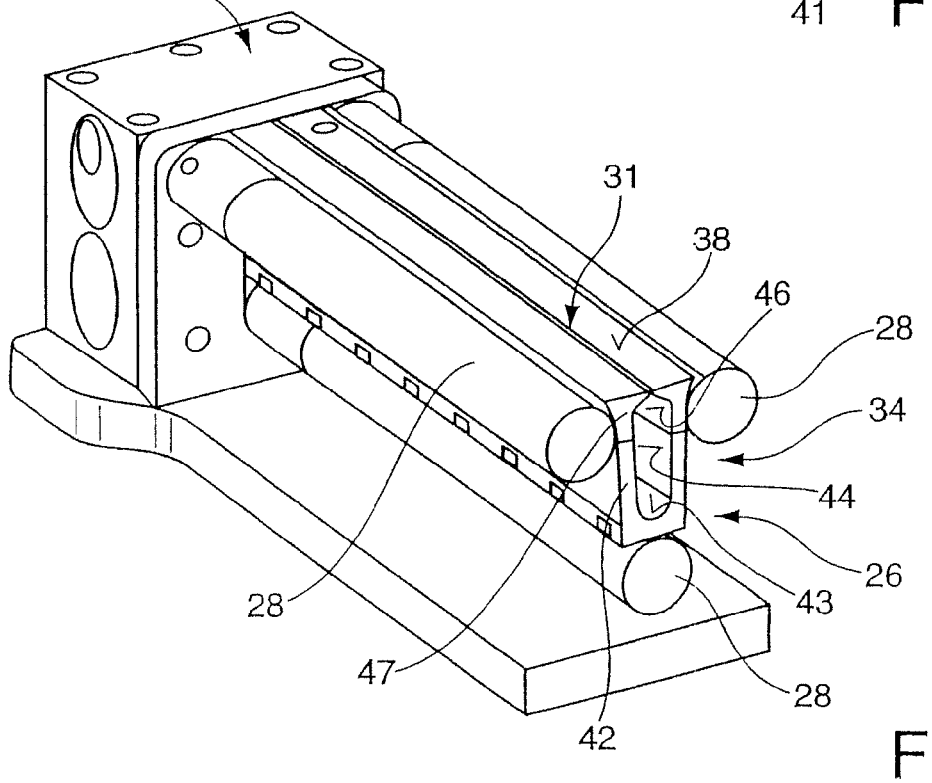
FIG. 3 shows a perspective sectional illustration of the beam-catching device of FIG. 2, FIGS. 4a-c show schematic plan views of alternative geometries of the opening of the beam-catching device of FIGS. 1-3, FIGS. 5a-c show side cross-sectional views of alternative embodiments of entry edges that form the opening of the housing of the beam-catching device of FIGS. 1-3.

A perspective sectional illustration of the beam-catching device 26 according to FIG. 2 is shown in FIG. 3. The housing 34 is has a multi-piece design. A bottom section 42 includes a base 43 and wall sections 44 that merge into wall sections 46 of a top section 47, which defines the opening 31 of the housing 34. Alternatively, a one-piece housing 34 or a housing 34 consisting of more than two sections can be formed.

Figures 4A, 4B, 4C:
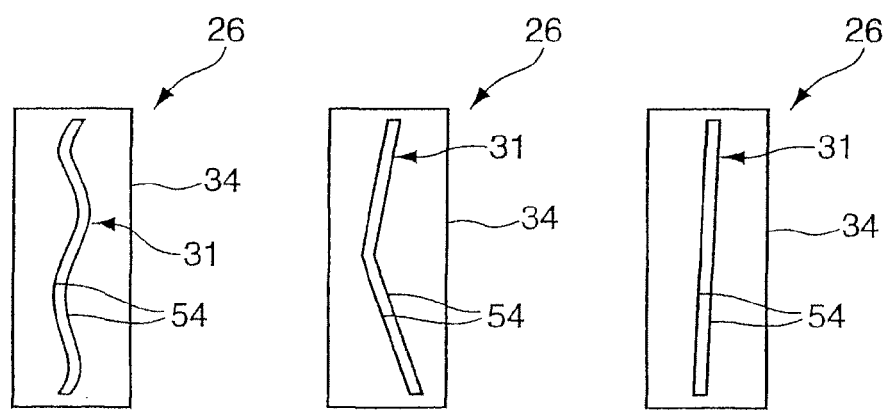

A schematic plan view of a beam-catching device 26 having different geometries of the opening 31 in the housing 34 is shown in FIGS. 4a to c. In the designs shown in FIGS. 1-3 and 4a-c, the opening 31 is line-like, that is, it is formed of a line that generally extends along the Y direction. The line can be straight (as shown in FIGS. 1-3 and 4c), can extend along an axis that is at an acute angle relative to the Y direction (as shown in FIG. 4c), can be curved (as shown in FIG. 4a), can be sinusoidal or serpentine, or can be made up of two or more line segments (as shown in FIG. 4b). In particular, according to FIG. 4a, the contour shape of the entry edges 54 for forming the opening 31 are of generally sinusoidal or serpentine design. In this case, both the amplitude and the period of the shape can be adjusted or varied. A roof-shaped configuration of the opening 31 is shown in FIG. 4b. The roof apex can extend from the legs or sides along the X direction. Both the slope and the length of the individual legs can be adjusted or varied. Another embodiment of an opening 31 of the beam-catching device 26 is shown in FIG. 4c. The entry edges 54 run at an angle to the direction of movement of the cutting head 22 in the Y direction. Further alternative geometries can likewise be realized.

Figure 5A:
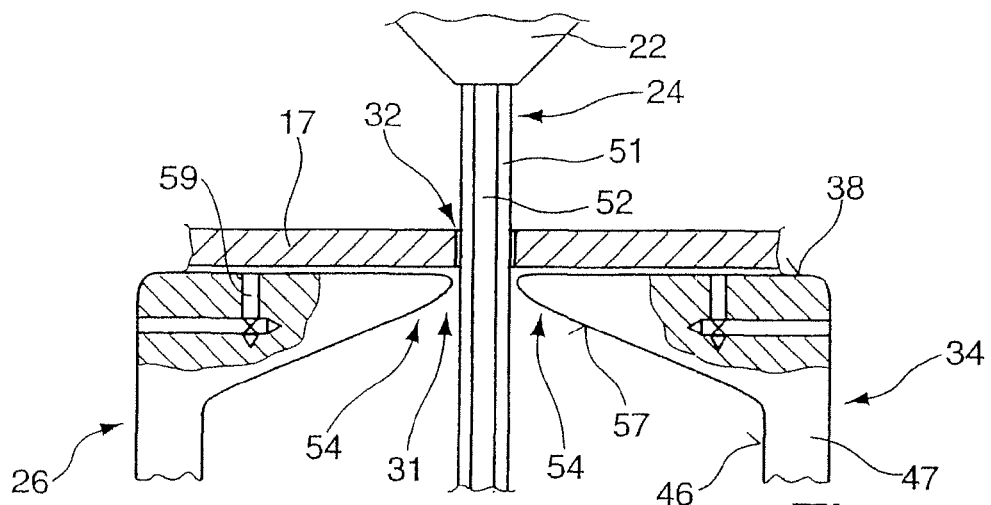

A schematically enlarged illustration of the opening 31 in cross section is shown in FIG. 5a. The cutting head 22 directs a cutting beam 24 onto the workpiece 17, and the cutting beam 24 discharges from the underside of the workpiece 17 into the opening 31. The cutting beam 24 consists of a formed beam 51 and of a gas flow 52 coaxial thereto. The beam 51 can be designed as a laser or a plasma beam, or as a flame cutting jet. A cutting gap 32 is formed in the workpiece 17 by the cutting beam 24. During this process, residual energy of the beam 24 and a residual quantity of gas of the gas flow 52 and also slag particles enter the housing 34. To form an exact cutting gap 32 (that is, a gap that is within manufacturing tolerances) and to avoid damage to the good parts and parts of the processing machine 11, the opening 31 is provided, the entry edges 54 of which project up to the gas flow 52 of the cutting beam 24, such that the cutting beam 24 enters the housing 34 in such a way as to be unaffected by the entry edges 54, that is, to be neutral in terms of flow. The entry edge 54 is formed by an end face 38 of the housing 34 and by an inner wall section 57 that is oriented at an angle of less than 90° relative to the end face 38. As a result, a wedge-shaped entry edge 54 is formed, which, in the region of the cutting beam 24 entering the opening 31, has a thickness has is virtually zero. The entry edge 54 is preferably designed to be sharp; that is, having two surface sections tapering to a point to form the entry edge 54 in the entry region of the cutting beam 24.

In order to reduce friction, the end face 38 of the housing 34 can include outlet openings 59 that feed air below the workpiece 17. As a result, an "air film bed" can be created in order to achieve a reduction in friction during the movement of the beam-catching device 26. Alternatively, mechanical systems, such as, for example, a roller bearing arrangement, driven rollers or bands or a sliding coating, can be provided.

Figure 5B:
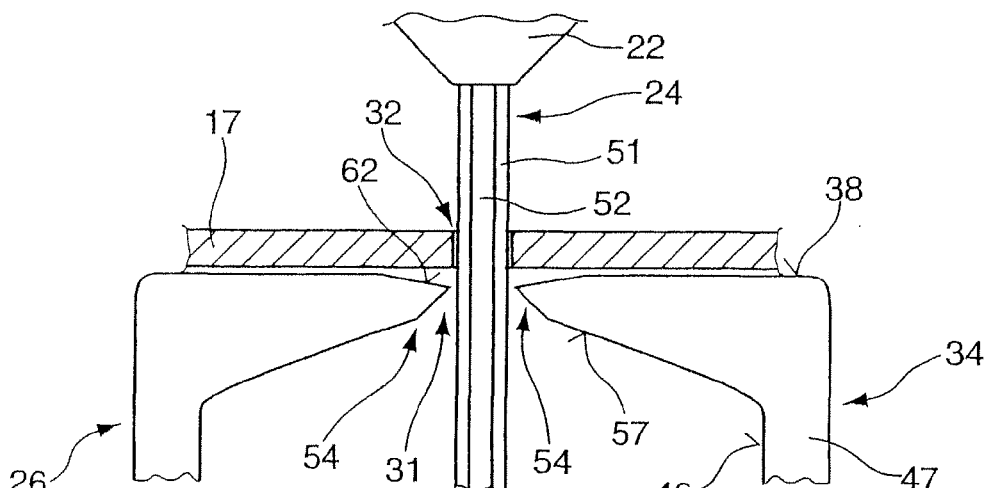

An alternative geometry of the entry edge 54 of an opening 31 of the housing 34 is shown in FIG. 5b. The entry edge 54 includes a surface section 62 that is designed as a bevel. As a result, the region of the entry edges 54 is designed to be recessed slightly relative to the supporting plane of the workpiece 17. The surface section 62 reduces or minimizes the risk of catching (for example, of the workpiece 17 getting stuck at the entry edges 54 such as from slag at the edge of a cut in the workpiece 17) and serves as an inclined contact surface. This surface 62 can be designed as a flat surface or a curved surface. The inclination in the case of a flat surface section 62 depends on the width of the surface section 62, such that a steeper inclination is usually provided in the case of shorter surface sections 62.

An alternative geometry of the entry edge 54 of the opening 31 of the housing 34 is formed in such a way that the surface section 62 is designed as a channel- or V-shaped recess. This means that, starting from the end face 38 of the housing 34, first, a surface section is provided that is inclined like the surface section 62 but, after a certain section width, the surface section changes the direction from "falling" to "rising" and extends up to the entry edge 54. The entry edge 54 can lie in the plane of the end face 38 and may also lie slightly below it. This achieves the effect that the parts that are already cut out and are still in the workpiece 17 do not become caught on the opening 31. On the contrary, these parts, immediately before reaching the opening 31, are stood up slightly by the geometry adjoining the opening 31 in order to avoid a risk of becoming caught on the opening 31. The geometry of the V- or channel-shaped recess, of the rising or falling surface sections, can be designed differently both with respect to the width of the surface sections and with respect to the slope and can be adapted to various applications. Likewise, the recesses can be designed as a semicircular or elliptical shape or as a further free form, which enables the parts already cut out to be stood up slightly as soon as the housing 34 is moved below the workpiece.

Figure 5C:
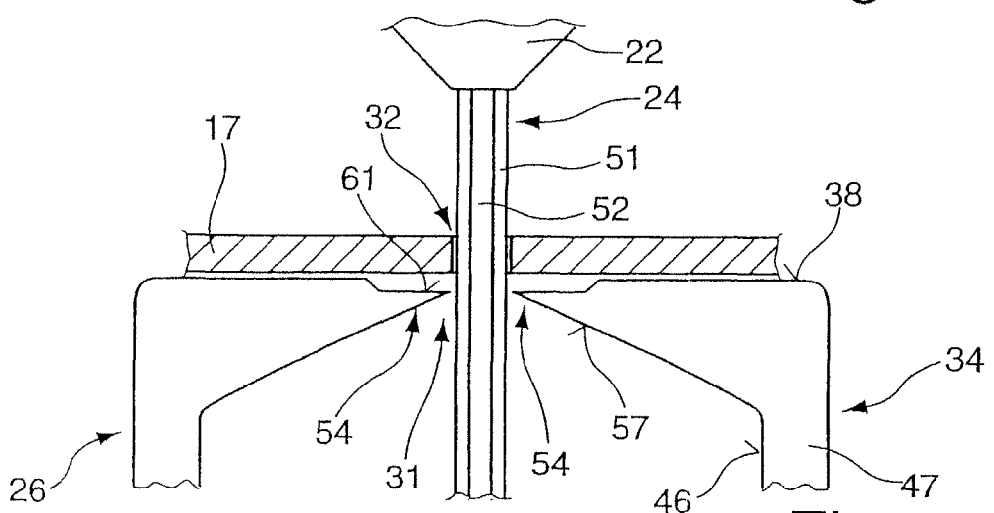

A further alternative configuration of the entry edge 54 is shown in FIG. 5c. A surface section 61 is provided so as to be parallel to and recessed relative to the end face 38 of the housing 34. A run-up section is provided in the transition region between the surface section 61 and the end face 38.

The inner wall section 57, which extends from a perpendicular wall section 46 up to the entry edge 54, can have a rounded shape. Alternatively, a plurality of surface sections arranged at an angle to one another can be provided in order to permit simple and cost-effective production. The arrangement of the inner wall sections 57, which are each in the shape of a lean-to roof as viewed in cross section, enables a large free space to be created immediately after the cutting beam 24 has entered the opening 31 in order to enable the interior space to be screened relative to the opening 31 to the greatest possible extent. At the same time, the inner wall sections 57 have the advantage that beam and slag reflections possibly occurring are reflected back in the direction of the opening 31 into the interior space of the housing 34.

Figure 6:
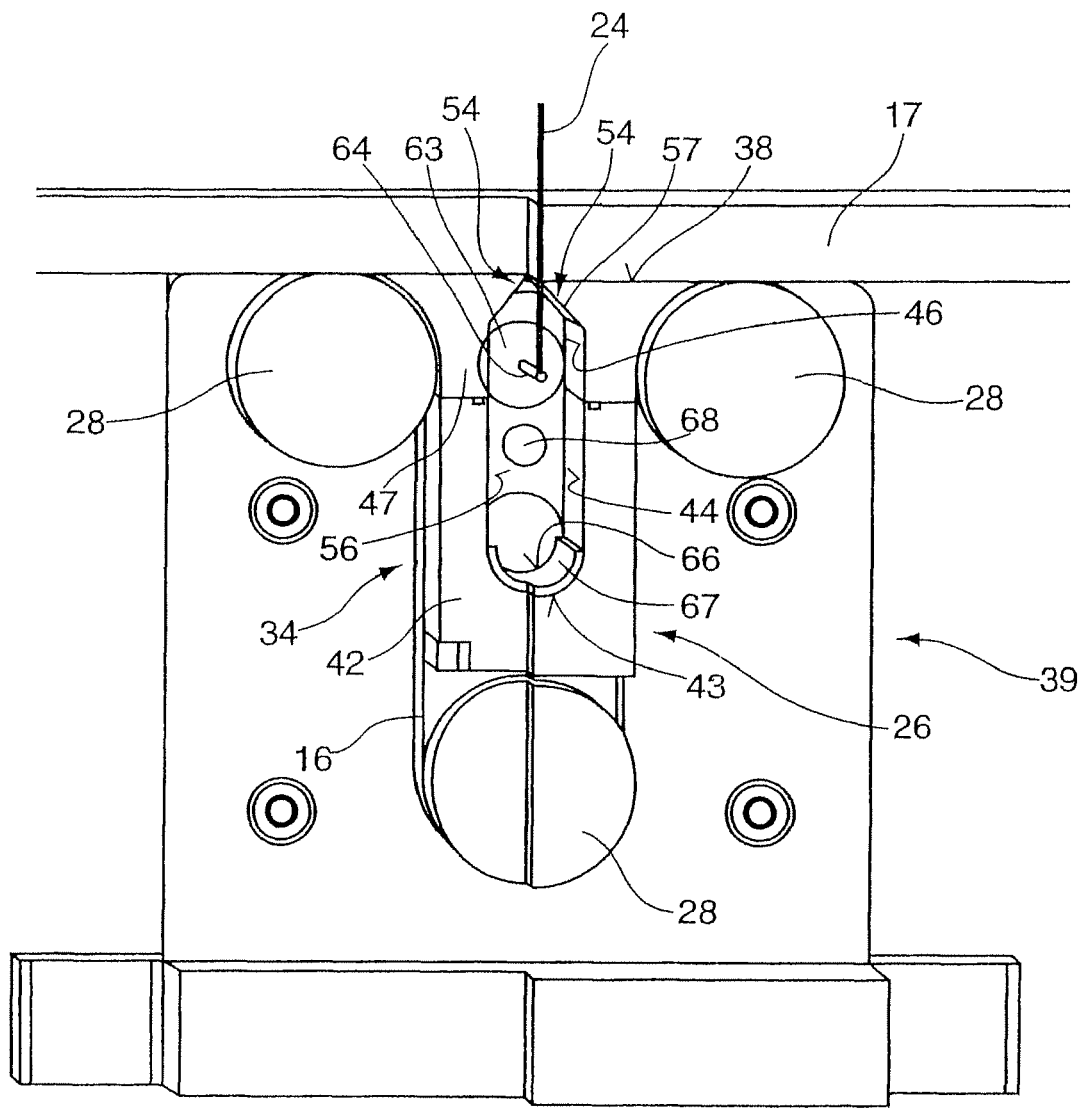
FIG. 6 shows a perspective view of the interior space of the housing of the beam-catching device of FIGS. 1-5c, where the view shows a free jet crossing the cutting beam.

A perspective sectional view of a housing 34 for the beam-catching device 26 for the absorption of the energy of the cutting beam 24 is shown in FIG. 6. The housing 34 can include at least one nozzle 63, through which, for energy absorption, a fluid jet 64, for example, a water jet, is introduced as a free jet into a beam-catching space 35 of the housing 34, in the course of which the fluid jet 64 crosses the cutting beam 24. The nozzle 63 as shown in FIG. 6 is in the end face 56 of the housing 34 and also extends through the flange unit 39 in a top region of the housing 34. As a result, energy absorption of the laser beam 52 and of its gas flow 51 is achieved. Beam reflections are prevented or reduced by this energy absorption.

The nozzle 63 can be formed by a nozzle body arranged interchangeably on the housing 34 or can be formed merely by an opening in the housing 34. The fluid jet 64 can be introduced at high pressure, such that the fluid jet 64 completely crosses the housing 34 essentially as a bundled jet. Alternatively, provision can be made for a fluid jet 64 to be introduced in each case at both end faces 56, where the fluid jets differ at least slightly in height, such that, at a greater distance, a dropping region of the fluid jet is covered by the opposite fluid jet.

A fluid flow for forming a flushing film 67 is admitted to the base 43 of the housing 34. A semicircular nozzle 66 is provided, through which the flushing film 67 is directed in a laterally rising manner in the base 43, which is of channel-shaped design. This makes it possible to draw off the slag and dust particles.

The flange unit 39 can include an extraction opening 68, through which ambient air can be drawn through the opening 31 and dust particles caught in the interior space of the housing 34 can be extracted. A vacuum can be produced in the housing 34 by a small opening width of the opening 31, thereby assisting the extraction.

The housing 34 is adapted in its outer geometry to the design of the machine bed 12. In order to provide a virtually gap-free transition between the supporting band 16 and the beam-catching device 26, an end face 38 extends in each case in the direction of the adjacent supporting band 16, such that a small transfer gap is formed between the deflection rollers 28 and the housing 34.

Furthermore, band cleaning for the supporting band 16 can be provided on the outer side of the housing 34. Brushes, scrapers, or the like can be attached for this purpose. At the same time, the flange units 39 can supply operating media, such as, for example, air or the like, to the additional elements attached to the outer side of the housing 34, such as cleaning elements, for example.

Figure 7:
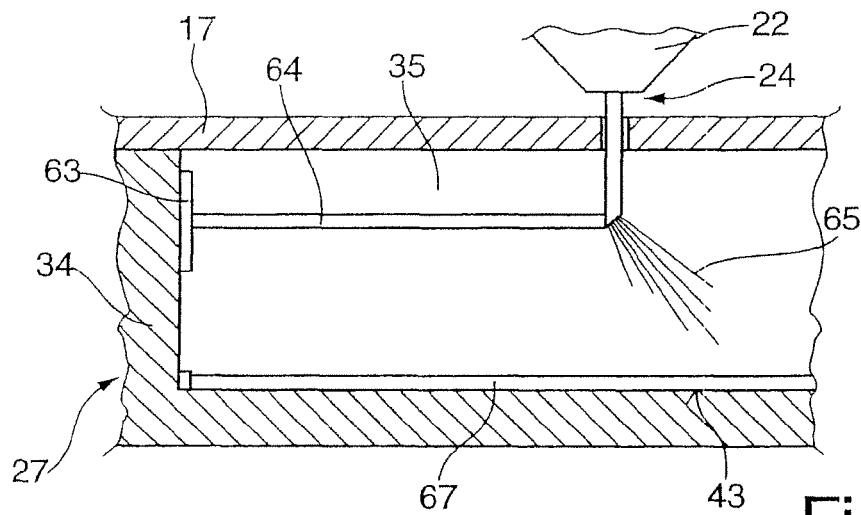
FIG. 7 shows a cross-sectional view of the beam-catching device of FIG. 6.

A schematic side view of the beam-catching device according to FIG. 6 is shown in FIG. 7. A cutting beam 24 entering the beam-catching space 35 crosses a fluid jet 64 discharging from the nozzle 63. When the cutting beam 24 strikes the fluid jet 64, a water film 65 is formed, and this water film 65 is deflected downward on account of the resulting impulse. At the same time, the fluid jet 64 is dispersed. As a result, the problem of backsplashes of water that occur and blowing-free of the flushing area at the base 43 of the housing 34 are prevented or reduced. The forming water film 65 at the same time wets the adjacent wall sections 38, 44, 46, 47, such that adherence of dust and slag particles is prevented.

The beam-catching devices 26 shown in FIGS. 6 and 7 are designated as line catchers.

Figure 8:
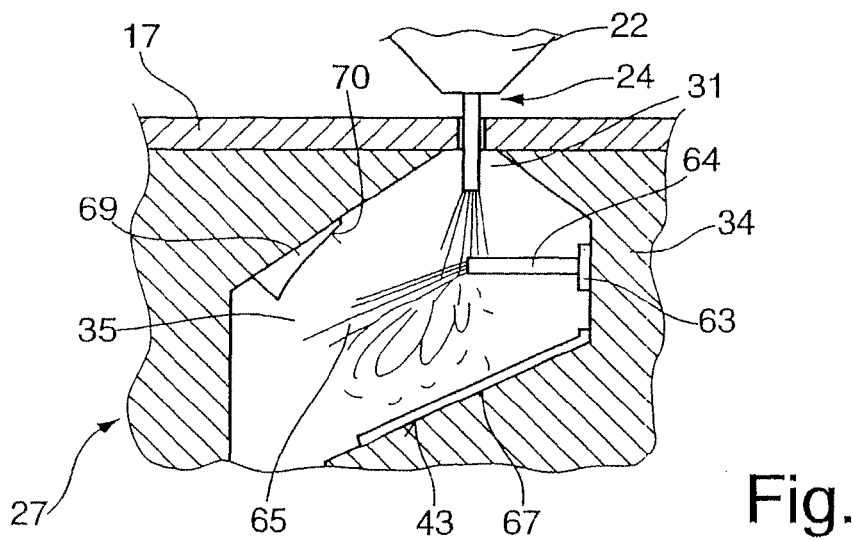
FIG. 8 shows a cross-sectional view of an alternative housing of the beam-catching device of FIG. 7.

FIG. 8 shows an alternative embodiment of a beam-catching device 26 with respect to FIG. 7. The beam-catching device of FIG. 8 is a "point catcher". In this case, the beam-catching device has a point-like opening 31, through which the cutting beam 24 can enter an essentially cylindrical beam-catching space 35 (which can be cylindrical about an axis that is parallel with the Z direction). The fluid jet 64 fed into the beam-catching space 35 through the nozzle 63 is oriented radially to the entry axis of the cutting beam and crosses the latter. A water film 65 again forms as a result. To facilitate the removal of slag and dust particles, an inclined base 34 is formed by a slope. This is only by way of example. Provided opposite the nozzle 63 in the beam-catching space 35 is a baffle element 69, which has a baffle surface 70 that is inclined in such a way as to point away from the opening 31 in the beam-catching device 26. As a result, additional uncontrolled splashing and reflecting of the fluid jet 64 is prevented or its reflection is controlled. In such point catchers, the workpiece 17 to be processed is moved relative to the workpiece support 14 or the opening 31.

Figure 9:
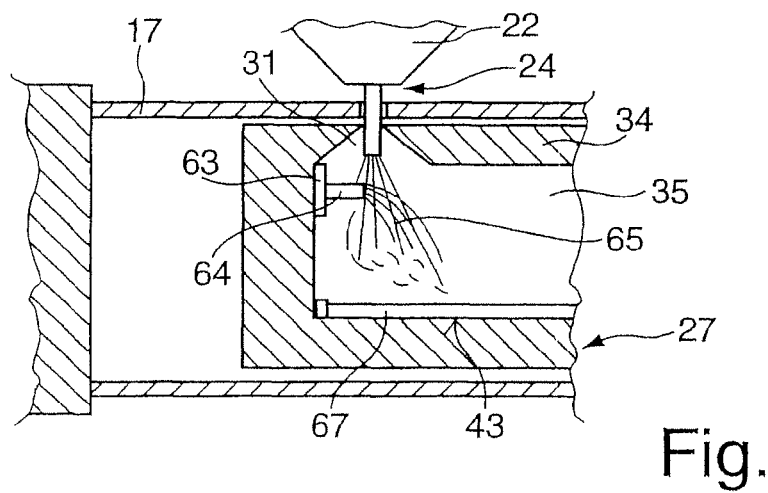
FIG. 9 shows a cross-sectional view of another embodiment of the housing of the beam-catching device of FIG. 7, FIGS. 10a-b show schematic sectional illustrations of cooled wall sections of the housing of the beam-catching device.

A further alternative embodiment of a beam-catching device is shown in FIG. 9. The beam-catching device of FIG. 9 is a "tube catcher" that is designed as a lance or a tube that is inserted into a tubular workpiece 17 to be processed by the cutting beam 24. The opening 31 is arranged in a lateral surface of the beam-catching device 26. The nozzle 63 for feeding the free jet 64 is assigned directly to the opening 31, for example, at an adjacent end face 38 of the housing 34. As a result, the water film 65 described with respect to FIG. 7 can again be produced and the advantages associated therewith can be achieved.

In the embodiments shown in FIGS. 6 to 9, one or more nozzles 63 for feeding one or more fluid jets 64 can be provided. The nozzles 63 can be controlled not only in the outflow direction but also in the volume of the fluid jet 64. In addition, the nozzles 63 can be arranged in a transversable manner, that is, the nozzles 63 can be arranged to direct the fluid jet along a non-perpendicular direction or angle relative to the cutting beam 24 (although as shown in FIGS. 6-9, the jet is directed generally perpendicularly to the cutting beam 24). For example, in other implementations, the fluid jet can be directed toward the opening 31 or toward the lower part of the housing 34. Furthermore, a plurality of nozzles 63 can be arranged side by side or in a circle or one above the other in order to form a joint fluid jet for the absorption of the kinetic energy of the incoming cutting beam 24. The individual advantageous features of the beam-catching device 26 that are described with reference to the exemplary embodiments can be combined with one another or interchanged in any desired manner.

As an alternative to the integrated cooling of the wall sections 44, 46, provision can be made for a cooling fluid film to be produced at these wall sections 44, 46 or at least at one of the two wall sections 44, 46. This can be made possible, for example, by an arrangement according to FIG. 10a or 10b. Provided in the wall section 46 is an undercut 71 that is covered by a surge element 72. Fluid is fed to the undercut 71 through a passage 73 that is fluidly connected to the flange unit 39. As a function of the quantity fed and of the pressure, the fluid can discharge from the gap 74 formed between the inner wall section 57 and the surge element 72 and can form a fluid film along the wall sections 44, 46, where the fluid film is collected and drawn off in the base 43. The size of the fluid film can be determined by the surge element 72, which is designed to be adjustable relative to the inner wall section 57.

An alternative embodiment is shown in FIG. 10b. In this embodiment, the surge element 72 is held, for example, in the inner wall section 57 by the gap 74.

An alternative embodiment for forming a cooling fluid film on the wall sections 44, 46, 57 of the housing 34 is shown in FIG. 11. For example, a plurality of spray nozzles 76 arranged in a row are provided, and these spray nozzles 76 form a fluid film or create a fluid curtain that extends down to the base 43 in order to protect the wall sections from the adherence of slag to them.

As an alternative to the configuration of a free jet or of a fluid jet 64 for the energy absorption of the cutting beam 24, the nozzles 76 according to the embodiment in FIG. 8 can form a fluid curtain that extends up to the opposite side of the housing 34 or forms a fluid mist. As a result, the fluid or water curtain crosses the cutting beam 24, thereby making it possible to absorb the energy. For the configuration of a fluid curtain, the nozzles 76 can preferably be activated individually and independently, such that the fluid curtain is formed only in the region of the incoming cutting beam 24.

Figure 12:
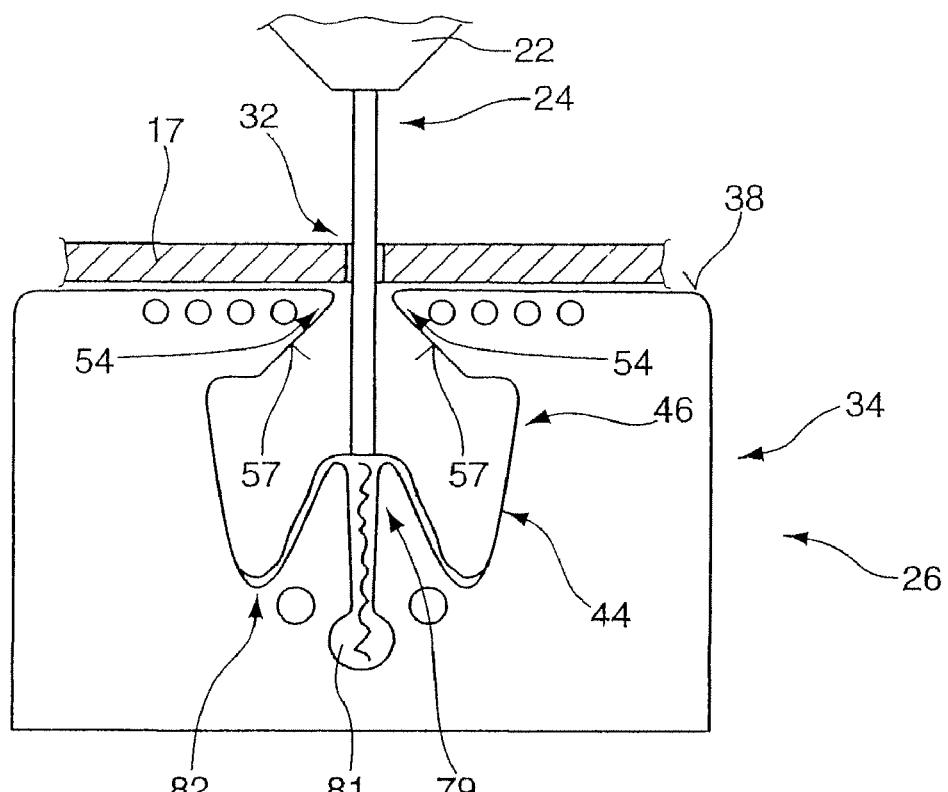
FIG. 12 shows a schematic sectional illustration of an alternative embodiment of the beam-catching device.

A schematic sectional illustration of an alternative housing 34 of the beam-catching device 26 is shown in FIG. 12. The entry edges 54 of the opening 31 of the housing 34 can correspond, for example, to one of the embodiments in FIGS. 5a-c and their alternatives. A base of the housing 34 is designed as a surge channel 79 that is supplied with fluid through a passage 81 lying underneath. The surge channel 79 can extend over the entire length of the housing 34. The fluid heated in the surge channel 79 is transferred into lateral discharge channels 82 on account of subsequently flowing fluid, such that slag residues can be bound and drawn off simultaneously. The cooling of the lateral wall regions 44, 45, which is described in the above exemplary embodiment can also be alternatively or additionally used in this case.

Figure 13:
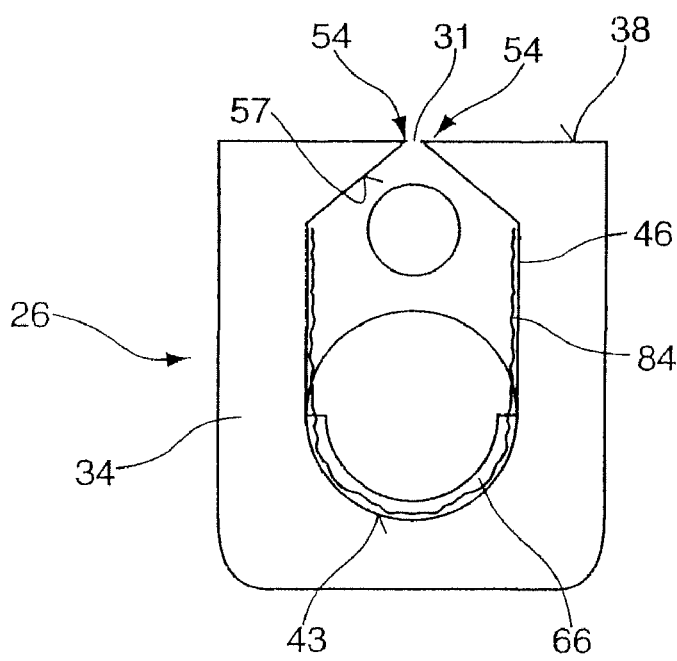
FIG. 13 shows a schematic sectional illustration of a further alternative embodiment of the beam-catching device.

A further alternative configuration of the housing 34 of the beam-catching device 26 is shown in cross section in FIG. 13. A fabric 84, which extends down to the base 43, is provided at least in the wall section 46 of the housing 34. By the capillary action of the fabric 84, at least the wall section 46 is moistened and protected from the adherence of slag. The fabric 84 can likewise extend over the wall section 42 up to the inner wall section 57. In addition, nozzles that introduce a fluid mist in order to wet the fabric 84 can be provided in individual regions in the lateral wall sections 44, 46 or the end faces 56 of the housing 34. The fabric 84 can be formed from heat-resistant material.

All the aforesaid features can be combined with one another in any desired manner.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A beam-catching device for a cutting-beam processing machine, the beam-catching device comprising:
   a housing defining an opening positioned to introduce a cutting beam provided by a cutting head of the processing machine, where the cutting beam is directed to a workpiece and discharged from an underside of the workpiece during beam processing, into a beam-catching cavity defined within the housing, and
   at least one nozzle positioned to feed a free jet of fluid comprising liquid into the beam-catching cavity in such a way that the fluid jet intercepts the cutting beam within the cavity for absorbing energy of the cutting beam,
   wherein the free jet of fluid is deflected downward on account of the impulse, which results when the cutting beam and free jet of fluid meet.

2. The beam-catching device of claim 1, wherein the housing opening is a line-like opening having an elongated beam-catching space, and the at least one nozzle is arranged on an end wall section and the fluid jet is oriented essentially parallel to the opening.

3. The beam-catching device of claim 1, wherein the housing opening is a point-like opening, the housing has an essentially cylindrical beam-catching cavity, and the at least one nozzle is arranged radially to the entry axis of the opening.

4. The beam-catching device of claim 1, wherein the housing opening is a point-like opening, the housing has an essentially tubular beam-catching cavity, the essentially point-like opening passes through a lateral surface of the housing, and the at least one nozzle is provided on an end face, assigned to the opening of the housing, and the fluid jet crosses an entry axis of the opening.

5. The beam-catching device of claim 1, further comprising a fluid film formed on a base of the housing by at least one nozzle, wherein the fluid film crosses the base of the housing.

6. The beam-catching device of claim 5, wherein the housing has a channel-shaped base that is supplied with fluid by a slotted nozzle in the shape of a segment of a circle.

7. The beam-catching device of claim 5, wherein the base of the housing has a surge channel below the opening, the cutting beam being caught in the surge channel.

8. The beam-catching device of claim 5, wherein the base of the housing has a transport band or a transport conveying worm.

9. The beam-catching device of claim 1, wherein a plurality of nozzles are provided on wall sections below the opening of the housing, and the plurality of nozzles form a fluid curtain in the beam-catching cavity of the housing, the fluid curtain intercepting the cutting beam.

10. The beam-catching device of claim 9, wherein the nozzles are each independently activatable.

11. The beam-catching device of claim 10, wherein at least the outflow direction of the nozzles or the volume of the fluid jet is set independently.

12. The beam-catching device of claim 1, wherein the housing defines a fluid-carrying channel.

13. The beam-catching device of claim 1, wherein the housing defines a slope that crosses the cutting beam.

14. The beam-catching device of claim 1, wherein the housing includes a baffle element on a wall section opposite the nozzle feeding the fluid jet into the beam-catching space, the baffle element having a baffle surface that is inclined in such a way as to point away from the opening of the housing.

15. The beam-catching device of claim 1, wherein lateral wall sections of the housing are wetted with a fluid film.

16. The beam-catching device of claim 1, wherein lateral wall sections of the housing are cooled.

17. The beam-catching device of claim 1, wherein lateral wall sections of the housing are provided with fabric, such that the wall sections are wetted with fluid by the capillary action of the fabric.

18. The beam-catching device of claim 1, wherein at least one extraction opening is provided in the housing, and an extraction device is attached to the extraction opening.

19. The beam-catching device of claim 1, wherein the opening of the housing is formed between entry edges that are formed by two surfaces arranged at an angle of less than 90° to one another, the entry edges being spaced apart such that the cutting beam enters the housing between the two entry edges essentially without contact.

20. The beam-catching device of claim 19, wherein the entry edge is sharp.

21. The beam-catching device of claim 19, wherein the entry edge adjoins an end face of the housing, the end face lying in a plane with the supporting plane of the workpiece to be processed.

22. The beam-catching device of claim 21, wherein the entry edge has a surface section that points toward the workpiece and that is recessed relative to the end face of the housing.

23. The beam-catching device of claim 22, wherein the surface section extends at least partly along the opening.

24. The beam-catching device of claim 19, wherein the entry edge is beveled.

25. The beam-catching device of claim 19, wherein the entry edge is removable.

26. The beam-catching device of claim 19, wherein the entry edge is formed from a plurality of individual segments.

27. The beam-catching device of claim 26, wherein at least one individual segment for forming the entry edge is movable to set a width of the opening.

28. The beam-catching device of claim 1, wherein the opening in the housing is of adjustable width.

29. The beam-catching device of claim 1, wherein the nozzle is defined at a wall of the housing.

30. A processing machine for workpiece processing, the processing machine comprising:
   a cutting head that produces a cutting beam directed toward a workpiece; and
   a beam-catching device for receiving a discharge of the cutting beam from an underside of the workpiece during processing of the workpiece, the beam-catching device comprising:
      a housing defining an opening positioned to introduce the cutting beam of the processing machine that is discharged from the underside of the workpiece into a beam-catching cavity defined within the housing, and
      at least one nozzle positioned to feed a free jet of fluid comprising liquid into the beam-catching cavity in such a way that the fluid jet intercepts the cutting beam within the beam-catching cavity for absorbing energy of the cutting beam, wherein the free jet of fluid is deflected downward on account of the impulse, which results when the cutting beam and free jet of fluid meet.

31. A method of processing a workpiece, the method comprising:

producing a cutting beam and directing the cutting beam toward a workpiece;

introducing the cutting beam that is discharged from an underside of the workpiece into a beam-catching cavity defined within a housing; and feeding a free jet of fluid comprising liquid into the beam-catching cavity in such a way that the fluid jet intercepts the cutting beam within the beam-catching cavity for absorbing energy of the cutting beam, wherein the free jet of fluid is deflected downward on account of the impulse, which results when the cutting beam and free jet of fluid meet.

* * * * *